United States Patent [19]
Scarborough

[11] Patent Number: 5,832,618
[45] Date of Patent: Nov. 10, 1998

[54] COMBINATION LEVEL AND T-SQUARE

[76] Inventor: Dane Scarborough, P.O. Box 3351, Hailey, Id. 83333

[21] Appl. No.: 690,827

[22] Filed: Aug. 1, 1996

[51] Int. Cl.⁶ ................................. B43L 7/02; G01C 9/00
[52] U.S. Cl. ................................. 33/451; 33/427; 33/464; 33/478; 33/479
[58] Field of Search .............................. 33/451, 374, 427, 33/429, 430, 437, 452, 464, 474, 478, 479, 480

[56] References Cited

U.S. PATENT DOCUMENTS

| | | |
|---|---|---|
| 636,191 | 10/1899 | Wright . |
| 649,422 | 5/1900 | Fry et al. ................................. 33/451 |
| 747,850 | 12/1903 | Bihlman . |
| 1,119,450 | 12/1914 | Parr ......................................... 33/451 |
| 1,182,730 | 5/1916 | Anderson . |
| 4,599,805 | 7/1986 | Padilla ..................................... 33/464 |
| 4,910,876 | 3/1990 | Channell ................................. 33/478 |
| 5,062,213 | 11/1991 | Kolesky .................................. 33/479 |
| 5,131,164 | 7/1992 | Miller ..................................... 33/613 |
| 5,353,509 | 10/1994 | Black ...................................... 33/451 |
| 5,433,011 | 7/1995 | Scarborough et al. ................. 33/478 |

*Primary Examiner*—Christopher W. Fulton
*Attorney, Agent, or Firm*—Gene Scott-Patent Law & Venture Group

[57] ABSTRACT

A combination level and T-square comprising an elongate level sensing section and an elongate T-bar section which can be alternately removed from or rigidly connected to the level sensing section in three locations to form three different configurations, a T-shape, a left-hand L-shape and a right-hand L-shape. The invention has two engagement hand screws; one for securing a sliding tongue into the level sensing section and the other for securing the T-bar to the tongue in one of the three desired configurations. The T-bar may be positioned further or closer to the level sensing section by sliding the tongue telescopically within the level sensing section.

8 Claims, 3 Drawing Sheets

COMBINATION LEVEL AND T-SQUARE

BACKGROUND OF THE INVENTION

1. Field of the Invention

This invention relates generally to carpentry tools, and more particularly to levels having a means for elongating and contracting, as well as levels that have a T-shape or L-shape form.

2. Description of Related Art

The following art defines the present state of this field:

Many carpenters' tasks require various lengths and sizes of levels and squaring tools. Various combination tools have been developed in order to reduce the number of individual tools required to complete such tasks. For example, extensible levels exist in the prior art that are useful for tasks requiring either a short or long level. Such extensible level art is found, for instance, in Bihlman, U.S. Pat. No. 747,850; Eltag et al, U.S. Pat. No. 1,403,676; Parrish, U.S. Pat. No. 1,413,056; Olivere, U.S. Pat. No. 2,879,606; and McSorley, U.S. Pat. No. 4,607,437. Such devices however cannot function as a T-square or as a right-angle rule, and therefore are not well suited to working in corners and other 90 and 45 degree angles. A few devices do exist in the prior art which can function as a right angle rule such as Wright, U.S. Pat. No. 636,191, and Anderson et al, U.S. Pat. No. 1,182,730, or as a T-square, Miller, U.S. Pat. No. 5,131,164, but the prior art does not teach a combination tool which combines these elements, i.e. the ability to function as a T-square and right-hand rule, and the ability to elongate and contract, all in one convenient tool.

The present invention fulfills these needs and provides further related advantages as described in the following summary.

SUMMARY OF THE INVENTION

The present invention teaches certain benefits in construction and use which give rise to the objectives described below.

The present invention provides an elongate level sensing section in combination with an elongate T-bar section. The elongate level sensing section has at least one flat surface, but preferably not less than three flat surfaces, for contact with a work surface. It also has two bubble levels, one to indicate level and one to indicate plumb. The level sensing section contains an engagement groove which connects to a sliding, removable engagement tongue, allowing the level sensing section to elongate telescopically.

Scarborough, U.S. Pat. No. 5,433,011 is hereby incorporated by reference into this application.

The T-bar section has three separate engagement locations, so that the T-bar and the level sensing section may alternately be configured as a left-hand L-shape, a right-hand L-shape, or a T-shape. Because of the invention's unique features and it's ability to transform into three configurations, it possesses advantages not taught by the prior art, which include, but are not limited to the following objectives:

The primary objective of the present invention is to provide a combination level device suitable for working with corners. A related objective is to reduce the number of leveling and squaring tools required in certain construction tasks, as well as to cut down the number of steps needed in certain such tasks, in order to save today's carpenter time and money. For example, when the invention is engaged in an L-shape configuration it possesses the characteristic of being a true right angle. This enables the carpenter to place the L-shape directly into the corner of a horizontal beam connected to a vertical beam. Once the horizontal beam is observed to be level, the vertical beam is automatically plumb, and vice-versa due to the L-shape configuration's true right angle nature. The carpenter need not reorient the level to the second beam to make sure it is level or plumb, therefore the steps to this task are reduced by 50%, saving both time and labor.

Another objective is to provide a level that can be conveniently hung next to a carpenter in it's L-shape configuration, such as on a joist.

A further objective is to provide the above advantages in combination with a level that has a telescoping feature, due to a tongue and slide mechanism, which enables it to elongate to various lengths, for various tasks. To this end it is the intention of the inventor to use this invention as an accessory to his previously patented multi-purpose device, already on the market.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE PREFERRED EMBODIMENT

Figure 1:
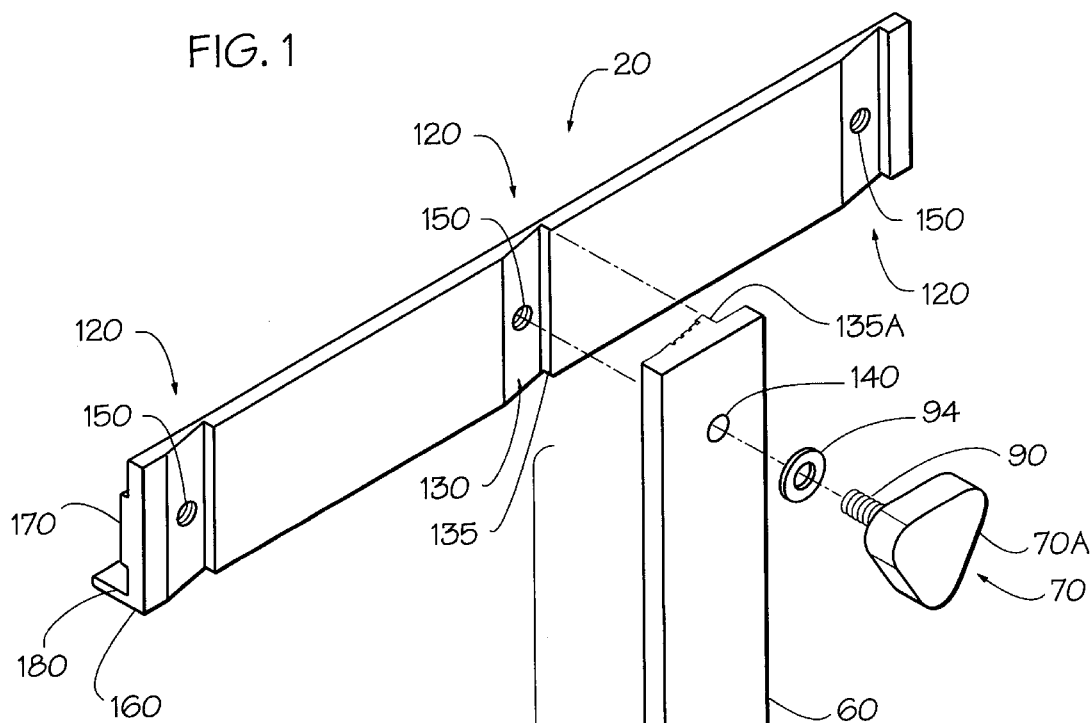
FIG. 1 is a perspective view of the preferred embodiment of the present invention in a T-shape cofiguration.
Figure 1A:
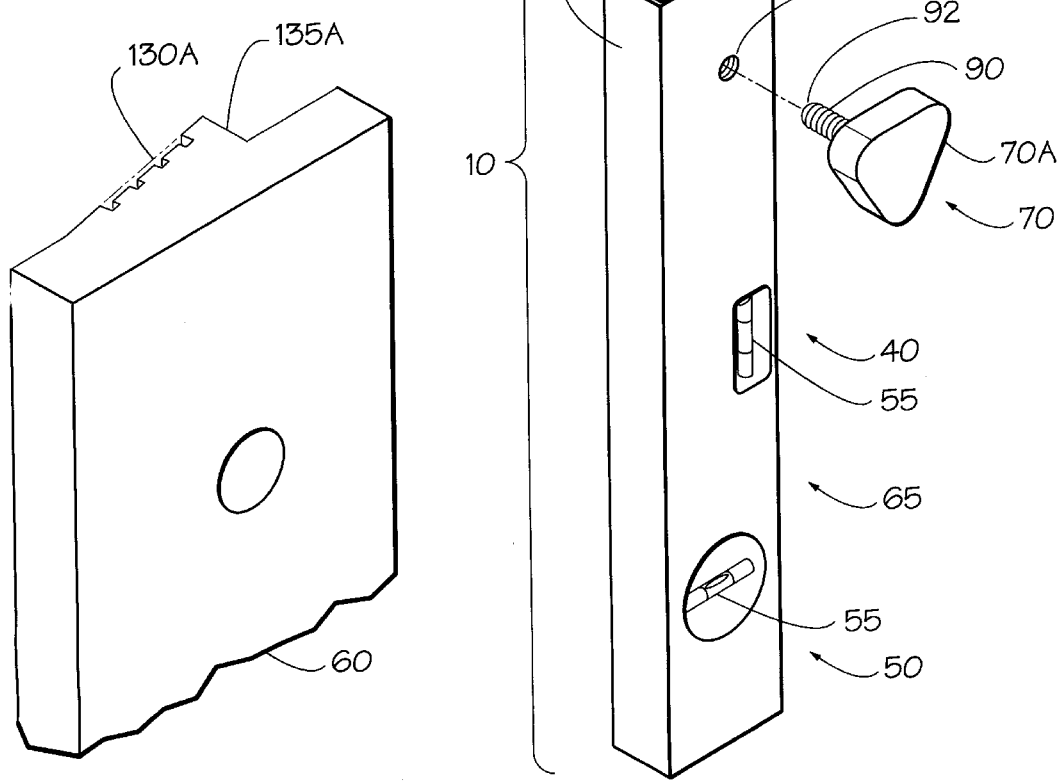
FIG. 1A is an enlarged view of an upper portion of item 60 shown in FIG. 1.
Figure 2:
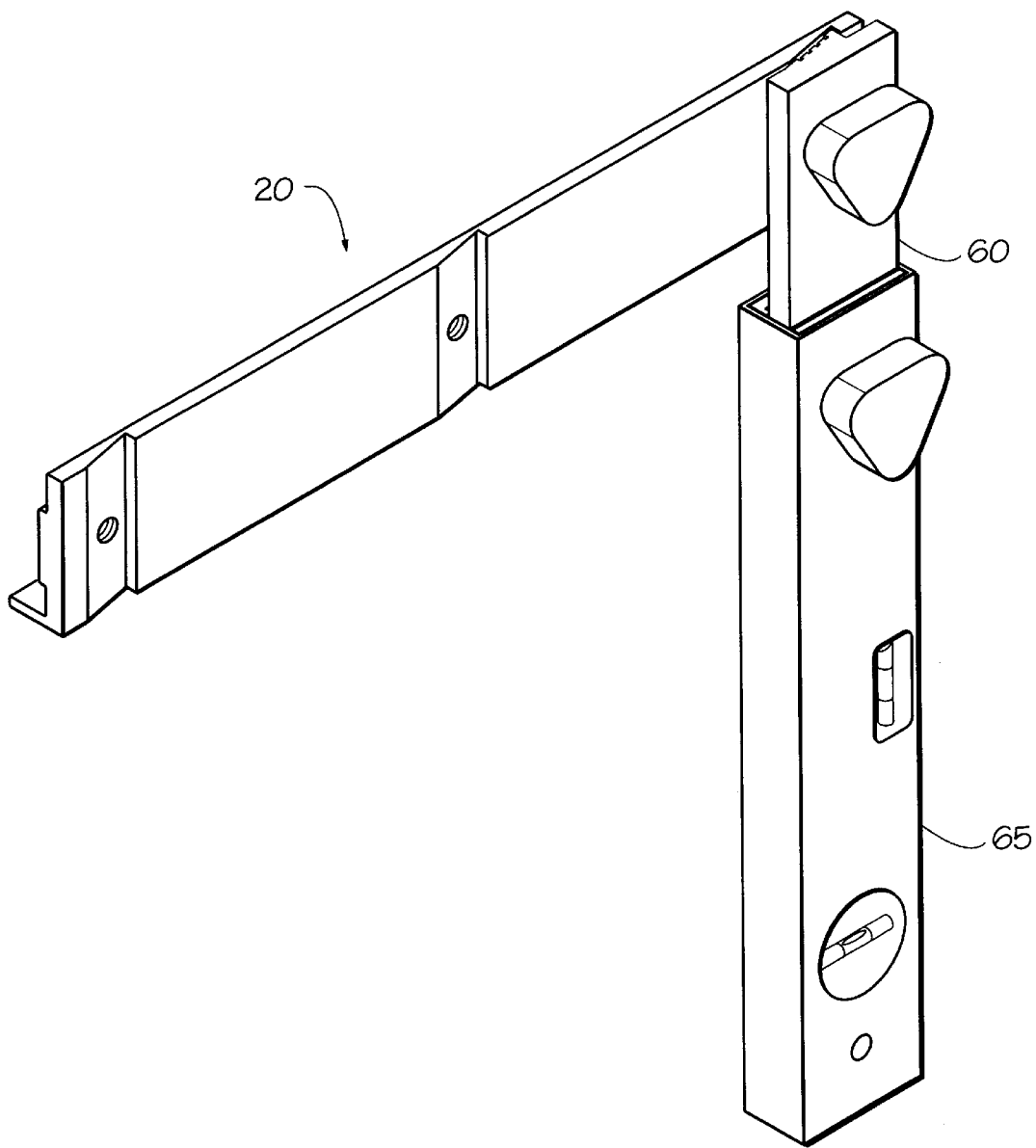
FIG. 2 is a perspective view of the preferred embodiment of the present invention in a left-hand L-shape configuration.
Figure 3:
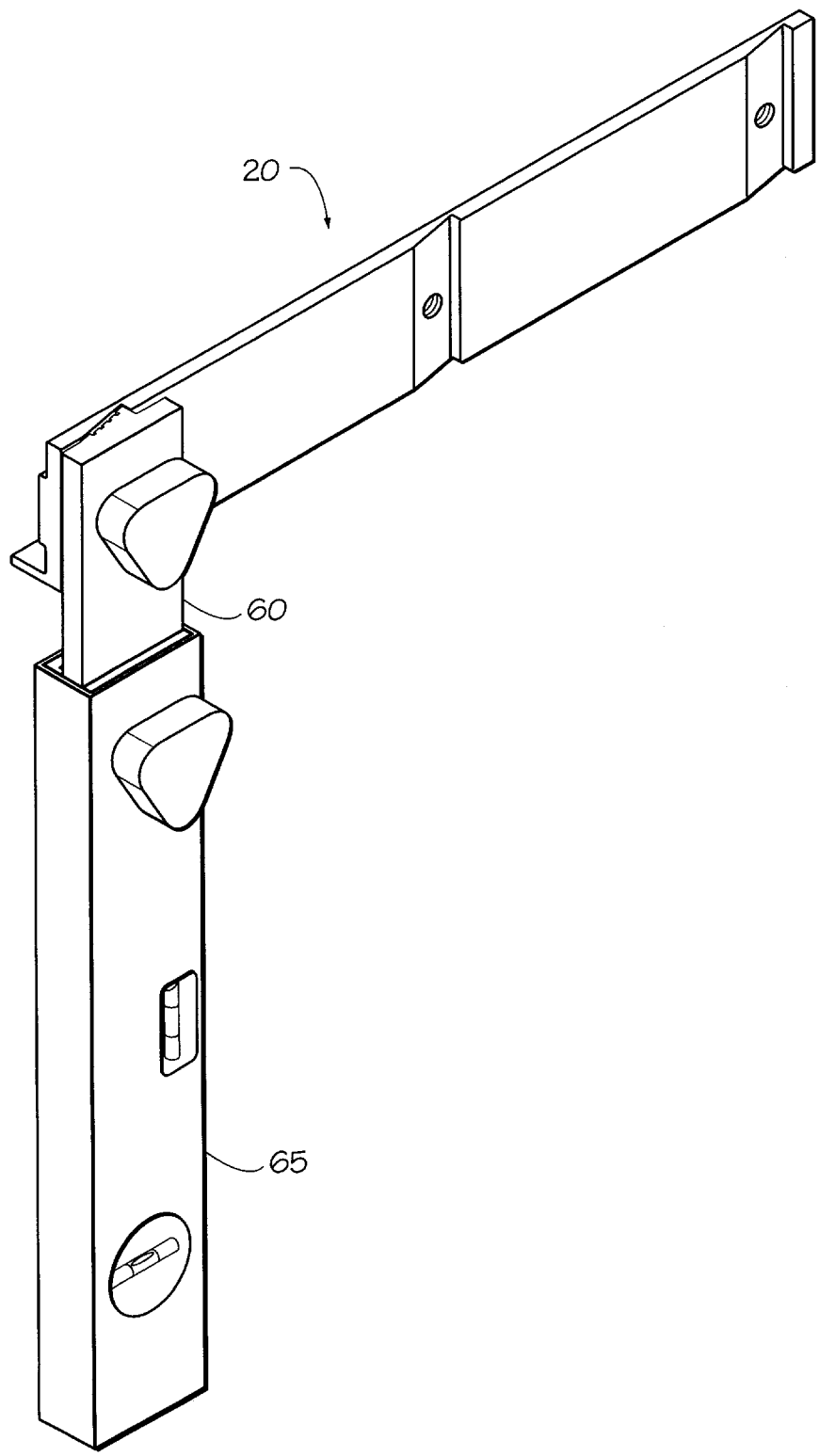
FIG. 3 is a perspective view of the preferred embodiment of the present invention in a right-hand L-shape configuration.

The above described drawing FIGS. 1, 2 and 3 illustrate the invention, a combination level and T-square comprising a level sensing section 10 and a T-bar section 20. The level sensing section 10 is comprised of two parts; a tongue 60, and a level sensing means 65. The tongue 60, and the level sensing means 65 may be alternately engaged or disengaged. The level sensing means 65 includes at least one longitudinally oriented, external, precision flat surface, and preferably three precision flat surfaces 30A, 30B, and 30C. Further, the level sensing means 65 preferably includes a first orientation sensing means 40, and a second orientation sensing means 50 arranged for indicating level, (true horizontal), and plumb, (true vertical), respectively, of any work surface (not shown) against which any one of the surfaces 30A–C are pressed. The orientation sensing means 40, 50, are preferably carpenter's bubbles 55 but other orientation sensing devices might be used alternatively.

The tongue 60 is preferably telescopically engaged within the level sensing means 65 by way of an engagement groove 68. This engagement groove 68 is preferably hard anodized with a teflon impregnation so that its coefficient of friction is as small as possible. For further elaboration on the means of engagement between the tongue 60 and the engagement groove 68 of the sensing means 65, please review Scarborough, U.S. Pat. No. 5,433,011. When correctly placed and tightened, the tongue 60 is precision aligned longitudinally with respect to the level sensing means 65. Also, the T-bar 20 is engageable with the tongue 60 so that it, the T-bar 20, is aligned orthogonally with respect to the sensing means 65 and may be extended to a selected distance from the level sensing means 65, while still being joined thereto and precision aligned.

Further, the level sensing section 10 has a means for engagement 70, preferably a hand screw, mounted in two locations; one, for engagement of the tongue 60 in the level sensing means 65 and the other for joining the T-bar section 20 to tongue 60. The hand screws 70, apply a lateral force on the tongue 60, such that relative movement of the tongue 60 within the engagement groove 68 and also, with respect to the T-bar is prevented and the previously discussed precision alignments are facilitated.

The means for engagement 70 is preferably of a pressure screw type, with a triangular shaped hand grip with rounded corners, for comfortable gripping and a threaded shaft 90. One of the engagement means 70 engages a tapped hole 100 in the level sensing means 65 for the clamping the tongue 60. The threaded shaft 90 preferably includes a tip 92 of a structural material having a low coefficient of friction such as nylon. The T-bar section 20 has several tongue attachment means 120; for positioning the tongue 60 at any of a plurality of selected locations on the T-bar section 20. At one of these locations a T-shape tool is assembled, as best seen in FIG. 1. At the other locations, a left-hand L-shape tool is formed as seen in FIG. 2, and in a third a right-hand L-shape tool is formed as seen in FIG. 3. The preferred means of attachment is again via the hand screw 70 which is inserted through a clearance hole 140, in the tongue, and then threaded into one of the tapped holes 150 in the T-bar 20, to secure the configuration into the desired form. In this case a low friction washer 94 is used to assure that upon tightening, the tongue 60 is able to move into position on the T-bar for precision alignment. As stated above, the preferred means of engagement are hand screws 70, however another lateral force producing means, such as spring loaded piston arrangements, cam and lever arrangements, etc. are alternatives. The T-bar section 20 also contains a second precision surface 160 which is oriented orthogonally to the first precision flat surface(s) 30A–C located on the level sensing means 65. The T-bar 20 is preferably L-shaped, with a relatively wide first wall 170 and a relatively narrow second wall 180 which includes the second flat precision surface 160 and is oriented orthogonally to the first wall 170. This allows the invention to be positioned flat against work surfaces that have a variety of configurations and angles. The manner of assuring a perfect right angle between the tongue 60 and the T-bar 20 is through the engagement of sloping surfaces 130 and 13A and positioning surfaces 135 and 135A respectively a part of the T-bar 20 and the tongue 60. As the hand screw 70 forces the surfaces 130, 130A into tight contact, the surfaces 135, 135A are brought into intimate contact and the T-bar 20 is forced to assume a right angle orientation with respect to the tongue 60. Relative motion between the tongue 60 and T-bar 20, surfaces 135 and 135A respectively, is facilitated by washer 91 preferable made of a nylon composition to assure low coefficient of friction. As tongue 60 is moved telescopically within level sensing means 65, T-bar 20 is positioned toward or away from sensing means 65, thereby elongating the reach of the tool. The surfaces 130 are hard anodized with a teflon impregnant to assure sliding between the surfaces 130 and 130A to arrive at contact between surfaces 135 and 135A.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination level and T-square comprising:

an elongate level sensing section providing a longitudinally oriented first precision flat surface, and a means for position indication, the position indication means indicating when the first precision flat surface has a near vertical or a near horizontal orientation;

an elongate T-bar section removably, rigidly engaged at a one end of the level sensing section, the T-bar section providing a second precision flat surface oriented orthogonally to the first precision flat surface of the level sensing section;

the level sensing section further including an elongate tongue, telescopically engaged within the level sensing section and longitudinally positionable therein for extending the length of the level sensing section;

the T-bar section providing a tongue attachment means for engagement of the T-bar section with the tongue of the level sensing section so that the T-bar section and the level sensing section may alternately be configured as a left-hand L-shape, a right-hand L-shape, or a T-shape;

the tongue attachment means providing an alignment means including a plurality of parallel grooves, each of the grooves comprising an inclined plane and an adjacent alignment surface, the tongue including a compound surface corresponding to any one of the parallel grooves, such that with the compound surface fully engaged in one of the grooves the second precision flat surface is oriented orthogonally to the first precision flat surface.

2. The combination of claim 1 wherein the T-bar is L-shaped, having a first wall including the parallel grooves, and a second wall, orthogonal to the first wall, the second wall including the second precision flat surface.

3. The combination of claim 2 wherein the second precision flat surface is directed toward the level sensing means.

4. The combination of claim 1 further including a low friction impregnant incorporated selectively into the combination for assuring low friction between selected contacting parts.

5. A combination level and T-square comprising:

an elongate level sensing section providing a plurality of longitudinally oriented first precision flat surface, and a means for position indication, the position indication means indicating when one of the first precision flat surfaces has a near vertical or a near horizontal orientation;

an elongate T-bar section removably, rigidly engaged at a one end of the level sensing section, the T-bar section providing a second precision flat surface oriented orthogonally to at least one of the first precision flat surface of the level sensing section;

the level sensing section further including an elongate tongue, engaged within the level sensing section and longitudinally positionable therein for extending the length of the level sensing section;

the T-bar section providing a tongue attachment means for engagement of the T-bar section with the tongue of the level sensing section so that the T-bar section and the level sensing section may alternately be configured as a left-hand L-shape, a right-hand L-shape, or a T-shape;

the tongue attachment means providing an alignment means including a plurality of parallel grooves, each of the grooves comprising an inclined plane and an adjacent alignment surface, the tongue including a compound surface corresponding to any one of the parallel grooves, such that with the compound surface fully engaged in one of the grooves the second precision flat surface is oriented orthogonally to the first precision flat surface.

6. The combination of claim 5 wherein the tongue is telescopically engaged within the level sensing means whereby the T-bar may be extended to a selected distance from the level sensing means.

7. The combination of claim 5 wherein the second precision flat surface is directed toward the level sensing means.

8. The combination of claim 5 further including a low friction impregnant incorporated selectively into the combination for assuring low friction between selected contacting parts.

* * * * *